(12) United States Patent
Faerber et al.

(10) Patent No.: US 7,762,624 B2
(45) Date of Patent: Jul. 27, 2010

(54) OPENABLE VEHICLE ROOF

(75) Inventors: Manfred Faerber, Wielenbach (DE);
Gerhard Skorianz, Maisach (DE);
Andreas Josef Zunzer, Munich (DE)

(73) Assignee: Webasto AG, Stockdorf (DE)

( * ) Notice: Subject to any disclaimer, the term of this patent is extended or adjusted under 35 U.S.C. 154(b) by 50 days.

(21) Appl. No.: 12/096,954

(22) PCT Filed: Dec. 14, 2006

(86) PCT No.: PCT/DE2006/002234

§ 371 (c)(1),
(2), (4) Date: Jun. 30, 2008

(87) PCT Pub. No.: WO2007/076801

PCT Pub. Date: Jul. 12, 2007

(65) Prior Publication Data

US 2008/0258510 A1    Oct. 23, 2008

(30) Foreign Application Priority Data

Dec. 15, 2005  (DE) ...................... 10 2005 060 043

(51) Int. Cl.
*B60J 7/057* (2006.01)
(52) U.S. Cl. ...................................................... 296/223
(58) Field of Classification Search .................. 296/214, 296/223, 216.06, 216.07, 216.08; 49/26–28
See application file for complete search history.

(56) References Cited

U.S. PATENT DOCUMENTS

| 4,293,161 | A  | * | 10/1981 | Lutz ........................... 296/213 |
| 4,684,768 | A  | * | 8/1987  | Sackmann et al. ........ 200/61.43 |
| 5,459,962 | A  | * | 10/1995 | Bonne et al. .................... 49/28 |
| 5,780,793 | A  | * | 7/1998  | Buchholz et al. ......... 200/61.44 |
| 5,988,736 | A  | * | 11/1999 | Kralik et al. ............ 296/216.06 |
| 6,186,586 | B1 | * | 2/2001  | Lindinger .................... 296/214 |
| 6,340,204 | B1 | * | 1/2002  | Seifert .................... 296/216.07 |
| 6,460,920 | B1 | * | 10/2002 | Reinsch ................. 296/216.08 |
| 6,917,002 | B2 | * | 7/2005  | Burgess et al. ........... 200/61.25 |
| 7,117,635 | B2 | * | 10/2006 | Thal et al. ....................... 49/28 |

* cited by examiner

*Primary Examiner*—Dennis H Pedder
(74) *Attorney, Agent, or Firm*—Fitch, Even, Tabin & Flannery; John M. Naber

(57) ABSTRACT

The invention relates to an openable vehicle roof which comprises at least one cover element (18) which is guided in lateral guiding rails (20B), by means of which said roof opening can be selectively closed or at least partially opened, and an anti-blocking device which guides along the guiding rails (20B). In order to offer active anti-blocking protection for vehicle passengers, the anti-blocking devices are formed, respectively, by a strip-shaped switching device (28) which interacts with respective guiding rail (20B) and which is connected to the control element of a cover element drive.

3 Claims, 6 Drawing Sheets

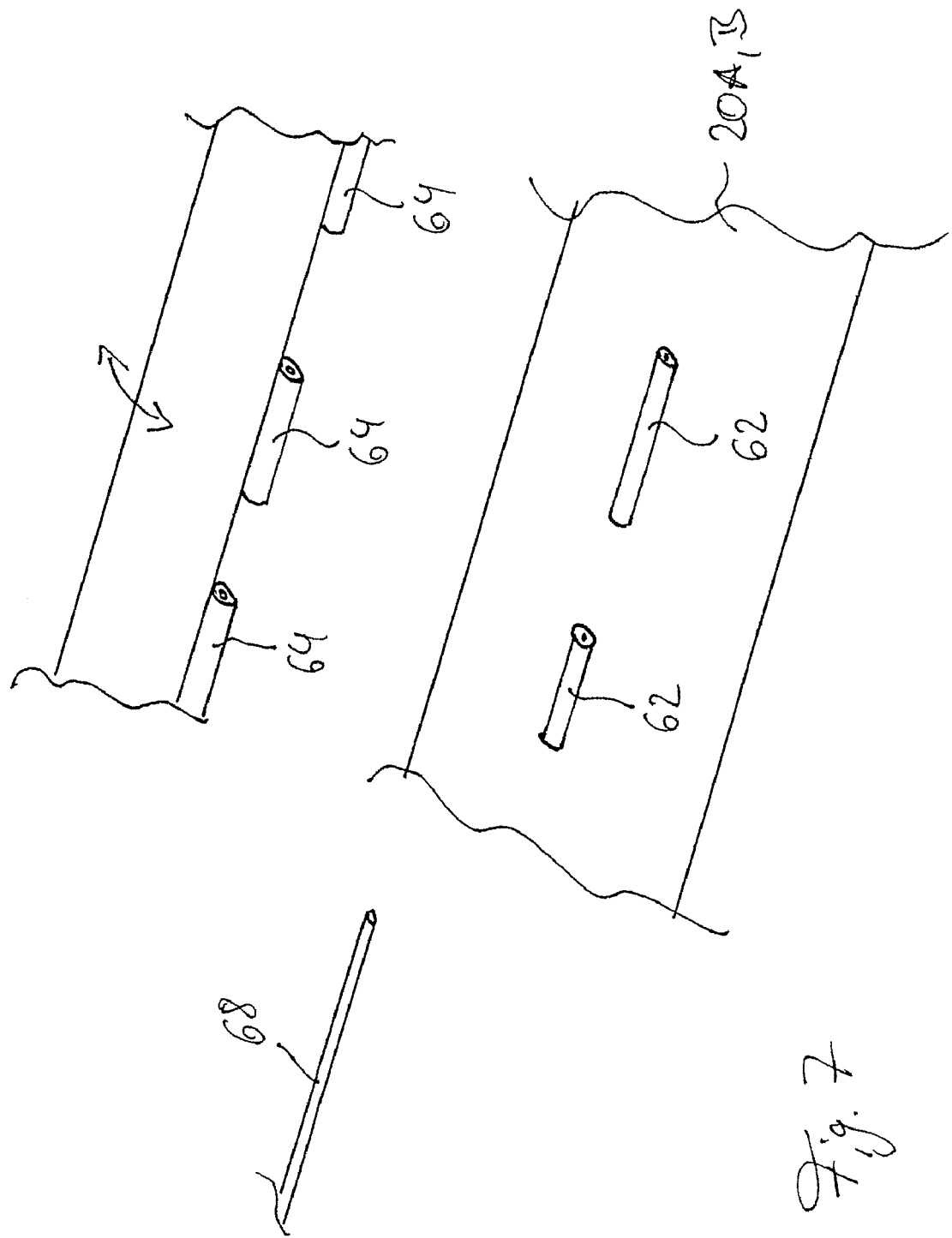

OPENABLE VEHICLE ROOF

This application is a 35 U.S.C. §371 National Stage entry of PCT/DE2006/002234, filed Dec. 14, 2006, which claims priority from German Patent Application No.: DE 10 2005 060 043.3, filed Dec. 15, 2005, the contents of which are herein incorporated by reference.

The invention relates to an openable vehicle roof having the features of the preamble of patent claim 1.

An openable vehicle roof having an anti-trapping device is known from DE 199 13 106 C1 and comprises a roof opening, which roof opening can be selectively closed off or at least partially opened by means of a cover element which is generally guided in lateral guide rails and which roof opening is surrounded by a hollow profile which serves as a sensor for detecting any trapping situation and which are provided with metallic conductors for this purpose. In a trapping situation, the hollow profile is deformed to such an extent that the metallic conductors are short-circuited, which in turn triggers a switching of the anti-trapping device and in particular stops or reverses a drive motor for the cover element. Said anti-trapping device however does not detect for example when a vehicle occupant reaches from the inside of the vehicle into a drive mechanism, which is arranged in the region of the guide rails, for the cover element.

Furthermore, it is known, for visual reasons, for acoustic reasons or else for safety reasons, to provide a faceplate which serves to cover a drive mechanism for the cover element, which drive mechanism is arranged in the region of the lateral guide rails of said cover element, such that it is not possible to see into said drive mechanism from the vehicle interior. In particular, a bellows which extends in the vehicle longitudinal direction is often used for this purpose, which bellows follows an opening-out movement of the cover element.

The invention is based on the object of providing an openable vehicle roof of the generic type specified in the introduction, having an anti-trapping device which acts in particular for vehicle occupants.

Said object is achieved according to the invention by means of the openable vehicle roof having the features of Patent Claim 1.

The essence of the invention is consequently that in each case one anti-trapping system, which preferably acts over the entire extent of the roof opening in the vehicle longitudinal direction, is provided at both sides of a roof opening in the region of guide rails for a movable cover element, which anti-trapping system is formed by the switching element and can be attached directly to the respective guide rail. Within the context of the invention, the anti-trapping device can be arranged, at any suitable point of the respective guide rails, in front of the drive mechanism for the cover element as viewed from the vehicle interior space, such that the anti-trapping device can prevent a vehicle occupant both from reaching into the possibly moving drive mechanism and also from being trapped by the cover element. In the event of a trapping situation being detected, a corresponding signal is transmitted to the drive motor controller and the movement of the cover element is stopped or else reversed.

The strip-shaped switching element can fundamentally be attached directly to the associated guide rail or, opposite the associated guide rail, to the cover element. For safety reasons, however, an attachment to the guide rail is advantageous because any impending trapping situations can then possibly even be detected early without a person who is at risk actually being trapped between the moving cover element and the vehicle body.

In one preferred embodiment of the vehicle roof according to the invention, the strip-shaped switching element is a profiled strip which is mounted in a resilient fashion and which interacts with a switch which is connected to the controller of the cover element. In a trapping situation, the profiled strip is pressed down counter to the spring force, such that the switch switches and transmits a corresponding signal to the controller for moving the cover element. The profiled strip is preferably spaced apart from the cover element at least in the closed position of the cover element. In the presence of a trapping situation, said spacing is bridged by a trapped body part or object.

In a special embodiment of the vehicle roof according to the invention, the profiled strip is a U-shaped profile, between the limbs of which engages a vertically aligned web of the guide rail. An in particular lug-like web of said type can be provided in any case in known sliding roof or tilting/sliding roof constructions, and also serves for example to fix certain functional elements or else fixed roof elements. The switching element can also be formed from a plurality of U-shaped profiles which engage one into the other, such that said switching element is telescopic in the vertical direction, that is to say in the direction of the limbs of the U-shaped profiles, in order to form a faceplate.

The profiled strip is expediently latched to the web or to the lug of the associated guide rail, and provided with stops for limiting the vertical movement of the U-shaped profile.

In a further special embodiment of the vehicle roof according to the invention, the profiled strip is connected, and thereby secured, to the associated guide rail by means of a joint. In this case, it can be necessary to additionally provide a lateral guide for the profiled strip, which lateral guide prevents lateral tilting of the profiled strip with respect to the associated guide rail. In the case of the above-specified profiled strip which is embodied as a U-shaped profile, the lateral guide can be formed by the limbs of the U-shaped profile. The profiled strip can be pivotable about a pivot axis which is aligned in the vehicle transverse direction or else about a pivot axis which is aligned in the vehicle longitudinal direction.

If the profiled strip is pivotable about a pivot axis which is aligned in the vehicle longitudinal direction, the respectively associated guide rail can have a section which is in the form of a C-shaped profile, in which the strip-shaped switching element is pivotably mounted by means of at least one cylindrical section. The switching element is preloaded in the upward direction by means of a spring element and interacts with the switch which is likewise preferably arranged on the guide rail.

Alternatively, a hinge-like joint can be provided, in which the strip-shaped switching element and the associated guide rail have sleeve sections which are in each case aligned with one another and through which extends a joint rod which have a clearance fit with respect to the guide rail or the switching element and a press fit with respect to the in each case other component.

In a further special embodiment of the vehicle roof according to the invention, the profiled strip is a faceplate for a drive mechanism of the cover element.

In this embodiment, during an opening-out movement of the cover element, the profiled strip preferably likewise performs an opening-out movement or a lifting movement, so as to ensure that the drive mechanism for the cover element is shielded even in the opened-out and if appropriate retracted state of the cover element. As the cover element is closed, the profiled strip is lowered or pivoted back again. The lowering movement is restricted, when there is no trapping situation, by the preload and the structural height of the mounting spring(s) for the profiled strip. If the profiled strip is a U-shaped strip and is placed onto a vertical lug, the opening-out path of the U-shaped profile is limited by the height of the lug and therefore correspondingly by the height of the limbs of the U-shaped profile.

In an alternative embodiment of the vehicle roof according to the invention, the strip-shaped switching element is a plastic profile which is preferably compressible in its transverse direction and which is provided with at least one electrical conductor. A plastic profile of said type can be designed as a capacitive sensor element or else as a resistive sensor element.

In the case of the design as a capacitive sensor element, the plastic profile is preferably provided with only one conductor. In the case of the design as a resistive sensor element, the plastic profile is preferably a hollow profile with two electrical conductors which are short-circuited in a trapping situation in which the plastic profile is compressed in the transverse direction. The two electrical conductors are arranged on the inner wall of the hollow profile. It is also conceivable for the hollow profile itself to be provided with two wall sections which are produced from an electrically conductive material and which are isolated from one another and which form the two conductors.

In the case in particular of the design of the anti-trapping device with a capacitive sensor element, it is possible even for a situation in which one of the guide rails is being approached to be evaluated as a trapping situation, such that any trapping situation is detected early and corresponding countermeasures, such as stopping or reversing a cover element drive, can be initiated.

The plastic profile can be provided with an adaptor cap which, for the purpose of cable guidance, is preferably arranged as close as possible to the drive motor controller.

Further advantages and advantageous embodiments of the subject matter according to the invention can be gathered from the description, from the drawing and from the patent claims.

Four exemplary embodiments of a vehicle roof according to the invention are illustrated in schematically simplified form in the drawing and are explained in more detail in the following description. In the drawing:

FIG. 7 shows a perspective plan view of a further embodiment, in an exploded illustration.

Figure 1:
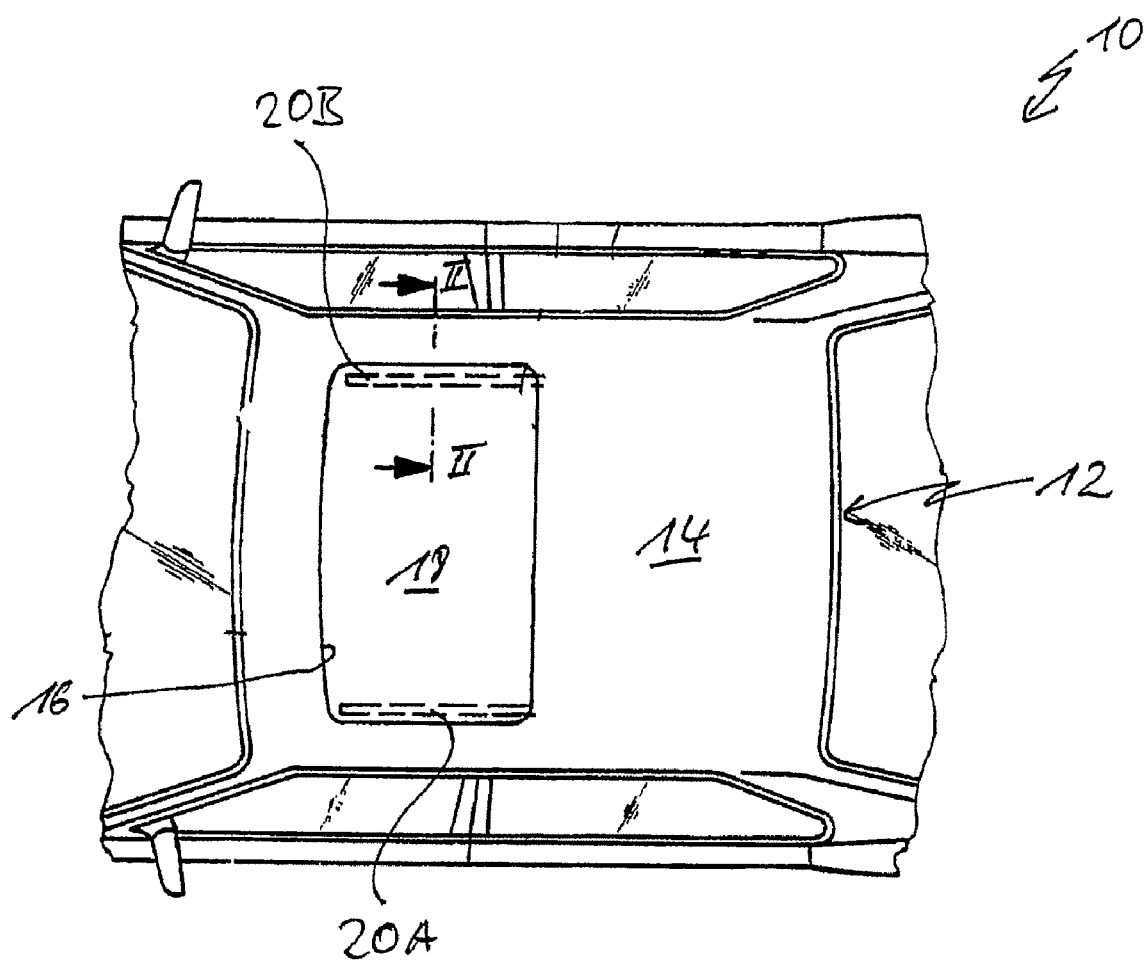
FIG. 1 shows a plan view of a vehicle roof having a sliding roof cover element which runs on the outside.

FIG. 1 illustrates a motor vehicle 10 which is provided with a vehicle roof 12 designed according to the invention. The vehicle roof 12 comprises a rear, fixed roof region 14 which is adjoined at the front by a roof opening 16 which can be selectively closed off or at least partially opened by means of a cover element 18 which is for example composed of a transparent glass pane. The cover element 18 is embodied as a sliding roof cover which runs on the outside and which, during opening, is consequently firstly pivoted outward with respect to a pivot axis which runs in the vehicle transverse direction, and moved over the rear, fixed roof region 14 on the outside of the vehicle.

Figure 2:
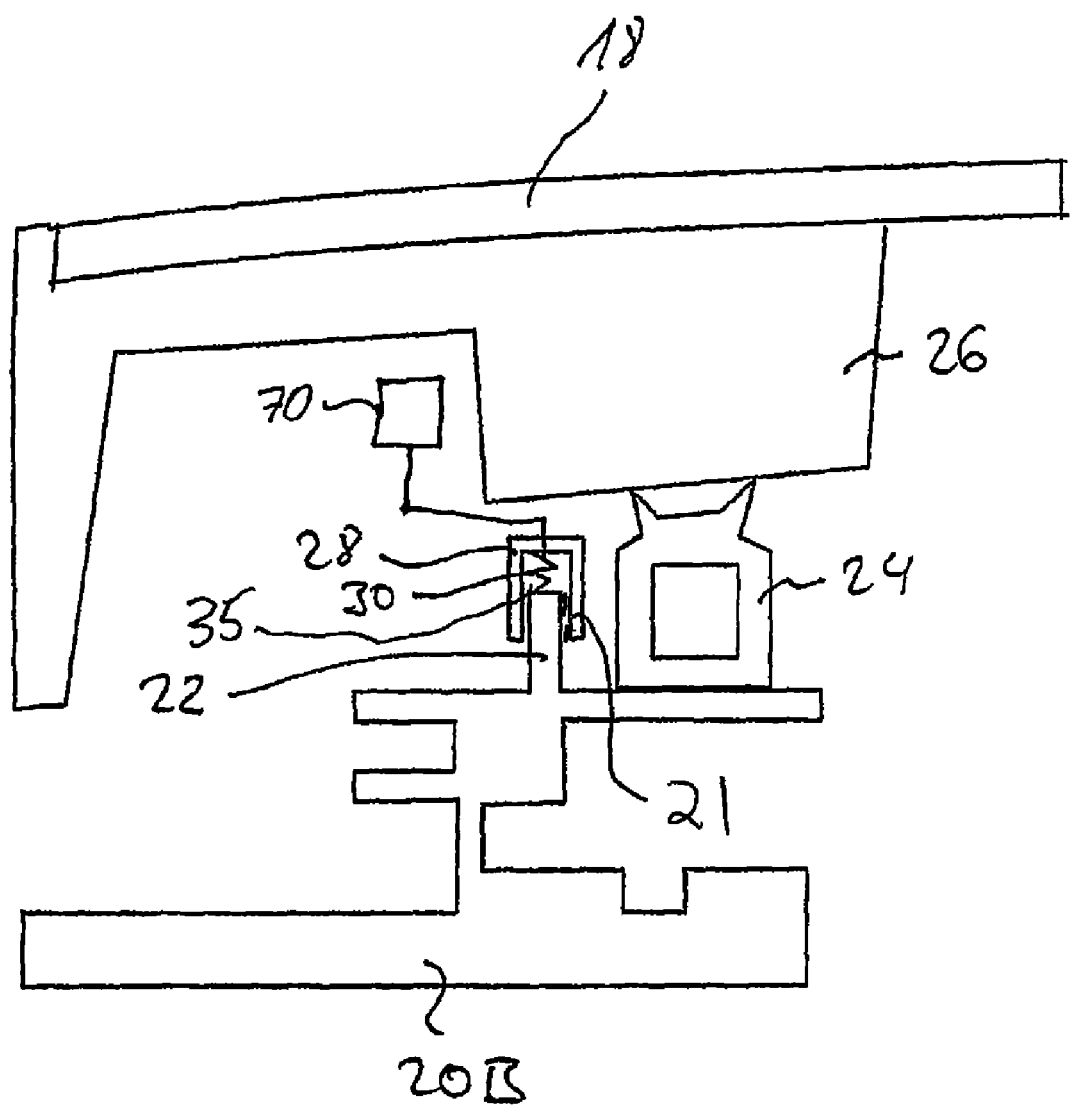
FIG. 2 shows a section through a guide rail region of the vehicle roof according to FIG. 1, along the line II-II in FIG. 1.

The roof opening 16 is delimited at both sides in each case by a guide rail 20A and 20B which extends in the vehicle longitudinal direction and in which a drive mechanism (not illustrated in any more detail here) for the cover element 18 is guided so as to be movable in the vehicle longitudinal direction. The two guide rails 20A and 20B are formed mirror-symmetrically with respect to one another, with FIG. 2 illustrating a cross section through the guide rail 20B which is at the right-hand side in the direction of travel.

The guide rail 20B has, in addition to guide channels for sliders and a drive cable for the cover element 18, a vertically upwardly projecting lug 22 which extends in the vehicle longitudinal direction and which can serve inter alia for fastening functional elements such as parts of the drive mechanism for the cover element 18.

Arranged at the inner side of the lug 22 with respect to the vehicle interior space is also an acoustic seal 24 which serves as a sound deadening element and, in the closed position of the cover element 18, bears against a foam cladding 26 which is formed on the underside of the cover element 18.

Furthermore, a U-shaped profile 28 is placed onto the web-like lug 22 in such a way that the lug 22, which extends over the length of the guide rail 20B, engages between the limbs of the U-shaped profile. The U-shaped profile 28, which constitutes a strip-shaped switching element, is advantageously mounted by means of a spring element 30. The U-shaped profile 28 is fixed by means of latching catches to the lug 22.

The U-shaped profile 28 serves as an anti-trapping device and, for this purpose, interacts with an electrical switch 35 which is connected to a controller 70 for the cover element 18. The switch switches if the U-shaped profile 28 is pressed downward, for example by 1 mm, counter to the force of the spring 30. A trapping situation of said type is for example present if an object or a body part of a vehicle occupant exerts a vertical pressure on the U-shaped profile, which is also the case if the object or body part is inserted into the intermediate space between the plastic foam cladding 26 and the U-shaped profile during the closing of the cover element 16. In the event of the switch switching, an emergency shut-off or reversal of the cover drive takes place.

As viewed from the vehicle interior space, the lug 22 and the U-shaped profile 28 which is placed onto the lug 22 are arranged behind the acoustic seal 24. Since the acoustic seal 24 is formed so as to be higher than the lug 22 with the U-shaped profile 28 placed on it, the anti-trapping device which is formed by the U-shaped profile 28 cannot be seen from the vehicle interior space. In an alternative embodiment, the lug and the U-shaped profile which is placed onto the lug could also be arranged in front of the acoustic seal.

Figure 3:
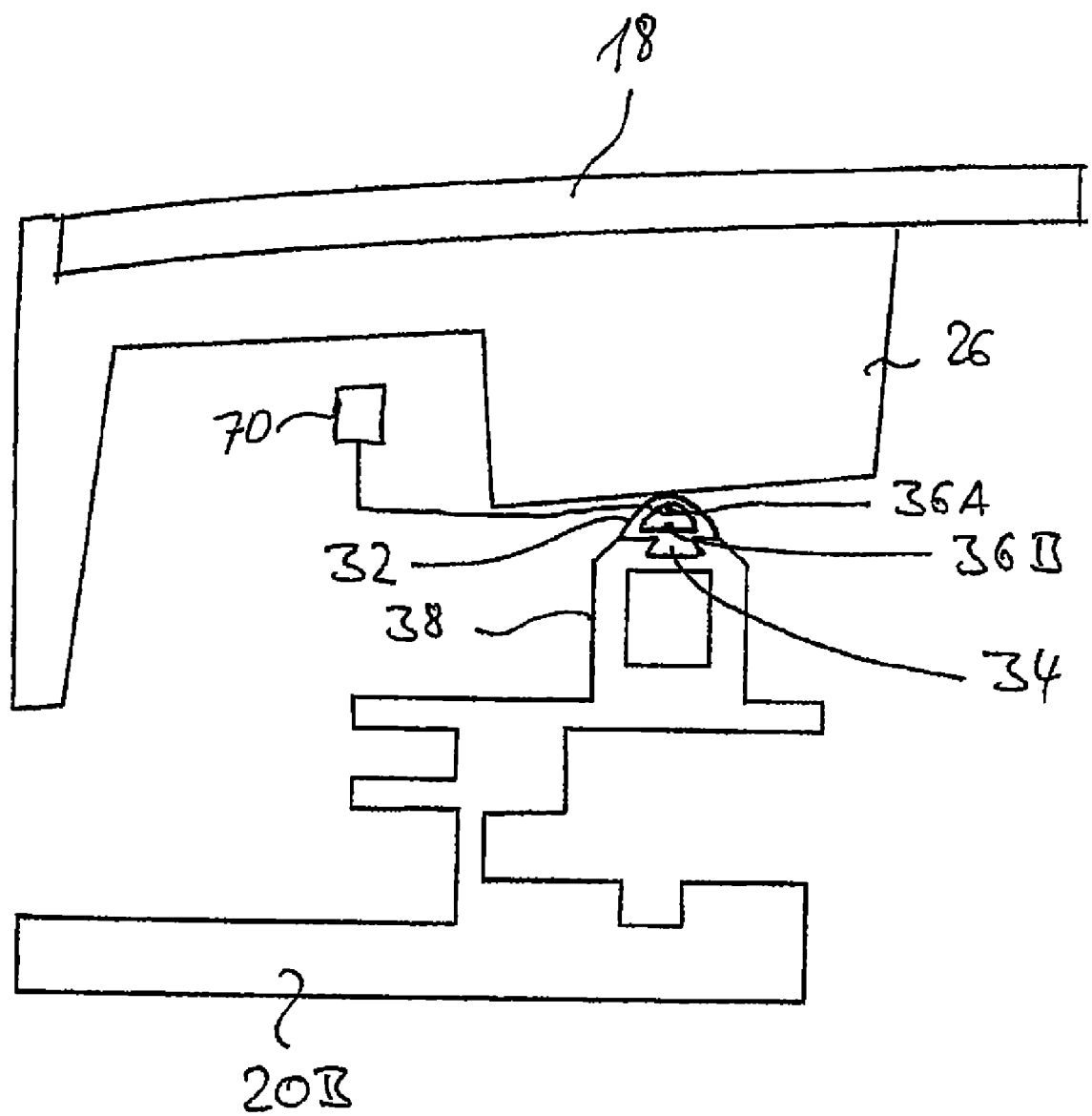
FIG. 3 shows a section corresponding to FIG. 2, through a guide rail region of an alternative embodiment of a vehicle roof designed according to the invention.

FIG. 3 shows an alternative embodiment of an anti-trapping device in a sliding roof, which runs on the outside, of the type illustrated in FIG. 1. This embodiment substantially corresponds to that in FIGS. 1 and 2, but differs from these in that its guide rails 20A, 20B have no vertical lugs onto which in each case one anti-trapping device is placed.

In fact, the guide rails 20A, 20B, of which likewise the guide rail 20B which is at the right-hand side in the direction of travel is illustrated in FIG. 3, are designed such that in each case one step 38 is formed on them, on which step 38 is placed a strip-shaped plastic hollow profile 32 which is connected to the step 38 by means of a foot 34 which is dovetail-shaped in cross section.

The plastic hollow profile 32, which forms a strip-shaped switching element, serves as an anti-trapping device and, for this purpose, has two electrical conductors 36A, 36B on its inner wall, which electrical conductors 36A, 36B are short-circuited in the event of a sufficiently large lateral pressure being exerted on the plastic hollow profile 32.

The plastic hollow profile 32 can consequently operate as a resistive sensor which switches if an additional object or a body part of a vehicle occupant is inserted between the plastic foam cladding 26 of the cover element 18 and the step 38 of the guide rail 20B, since the plastic hollow profile 32 is then compressed in its transverse direction.

Figure 4:
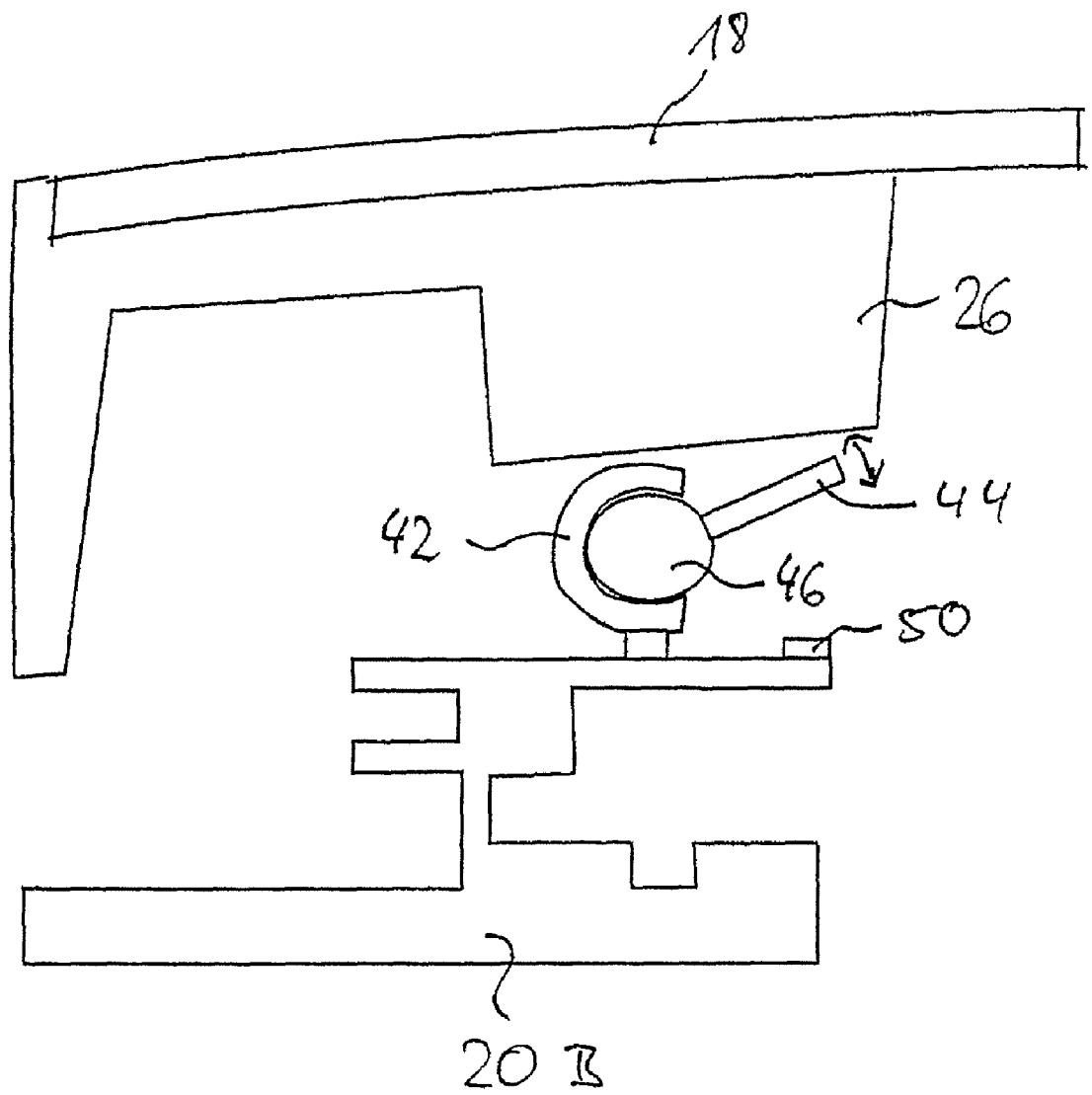
FIG. 4 shows a section corresponding to FIG. 2, through a guide rail region of a further embodiment of a vehicle roof designed according to the invention.
Figure 5:
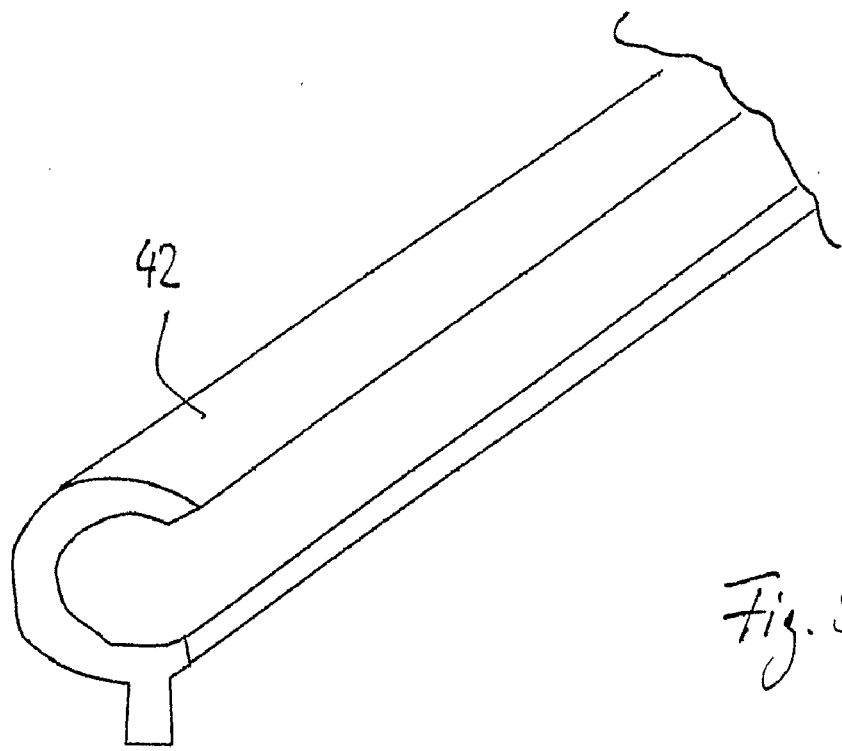
FIG. 5 shows a perspective view of a fastening region for an anti-trapping device in the guide rail illustrated in FIG. 4.
Figure 6:
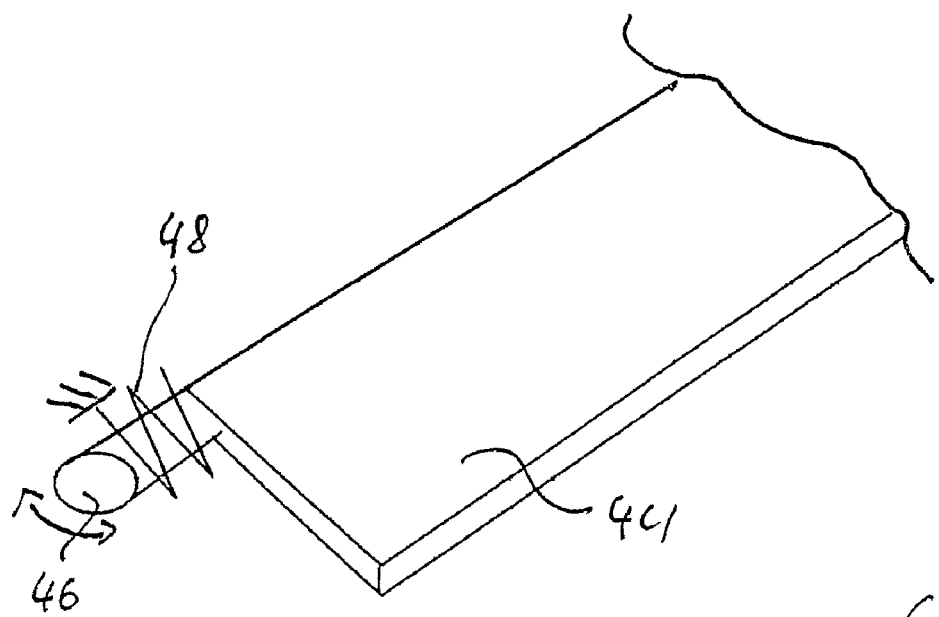
FIG. 6 shows a perspective view of the anti-trapping device.

FIGS. 4 to 6 show a further embodiment of an anti-trapping device in a sliding roof, which runs on the outside, of the type illustrated in FIG. 1. This embodiment differs from the embodiment as per FIGS. 1 and 2 in that it comprises lateral guide rails 20A, 20B which are provided in each case at their upper side with a receptacle 42 in the form of a C-shaped profile, in which C-shaped profile is mounted a strip-shaped switching element 44 which serves as an anti-trapping device and which is of substantially plate-shaped design, points in the direction of the vehicle longitudinal central plane and is mounted by means of a cylindrical section 46 in the receptacle 42 of the guide rail 20A, 20B, such that said switching element 44 is pivotable about a pivot axis which runs substantially in the vehicle longitudinal direction. The switching element 44 also serves as a faceplate for shielding the mechanism for actuating the cover element.

In the rest position, the switching element is preloaded in the upward direction by means of a spring device 48 which engages on the cylindrical section 46. If an object or a body part is arranged between the cover element and the associated guide rail 20A or 20B, the switching element 44 is pressed downward as the cover element is closed, such that said switching element acts on a switch 50 and the movement of the cover element is stopped or reversed by means of the cover element drive controller.

FIG. 7 illustrates a further embodiment of an anti-trapping device, embodied according to the invention, in an openable vehicle roof. This embodiment substantially corresponds to that of FIGS. 4 to 6 and differs therefrom in that sleeves 62 are formed in each case on the guide rails 20A, 20B, which sleeves 62 are aligned with sleeves 64 which are formed on a strip-shaped switching element 66. A bearing rod 68 extends through the sleeves 64 and 66, with a clearance fit being provided between the sleeves 64 and the bearing rod 68 and with a press fit being provided between the sleeves 66 and the bearing rod 68.

The switching element (not shown) is in turn preloaded in the upward direction by means of a spring element (not illustrated in any more detail here) which can engage on the bearing rod 68 or directly on the switching element 66, and when said switching element 66 is pressed downward, it interacts with a switch (likewise not illustrated) for an emergency stop of the cover element movement.

The invention claimed is:

1. An openable vehicle roof, comprising at least one cover element which is guided in lateral guide rails and by means of which a roof opening can be selectively closed off or at least partially opened, and, along the guide rails, in each case one anti-trapping device, characterized in that the anti-trapping devices are formed in each case by a strip-shaped switching element which interacts with the respective guide rail and which is connected to a controller of a cover element drive; and characterized in that the profiled strip is a U-shaped profile, between the limbs of which engages a vertically aligned lug of the associated guide rail;

and in that the strip-shaped switching element is formed from at least one profiled strip which is mounted in a resilient fashion and which interacts with an electrical switch within the U-shaped profile which switches in the presence of a trapping situation in which the profiled strip is pushed downwards.

2. A barrier system for mirror image lateral guiderails and mechanisms of a vehicle sunroof system, comprising:

an inboard lug laterally disposed along the length of the lateral guiderails;

an inverted U-shaped profile disposed and vertically slidable on top of and along each side of the vertical lug;

a spring element to urge the U-shaped profile upwardly; and an anti-trapping device comprising a strip-shaped switching element disposed between the lug and U-shaped profile connected to a controller to alter sunroof movement when it senses the U-shaped profile is forced downward.

3. The barrier system of claim 2, further comprising an acoustic barrier inboard to and higher than the barrier system.

* * * * *